United States Patent [19]

Djordjevic et al.

[11] Patent Number: 4,753,587

[45] Date of Patent: Jun. 28, 1988

[54] EXTRUSION DIE FOR THE PRODUCTION OF A FLAT SHEET OF THERMOPLASTIC MATERIAL

[75] Inventors: Dragan Djordjevic; Uwe Schümichen, both of Erkrath, Fed. Rep. of Germany

[73] Assignee: ER-WE-PA Maschinenfabrik und Eisengiesserei GmbH, Erkrath, Fed. Rep. of Germany

[21] Appl. No.: 87,822

[22] Filed: Aug. 21, 1987

[30] Foreign Application Priority Data

Aug. 26, 1986 [DE] Fed. Rep. of Germany ....... 3628974

[51] Int. Cl.⁴ ..................... B29C 47/16; B29C 47/92
[52] U.S. Cl. .................. 425/140; 425/133.5; 425/141; 425/381; 425/466
[58] Field of Search .................. 425/133.5, 140, 141, 425/143, 144, 381, 466; 264/40.5, 176.1, 177.1

[56] References Cited

U.S. PATENT DOCUMENTS

| | | | |
|---|---|---|---|
| 2,387,718 | 10/1945 | Coleman | 425/466 |
| 2,938,231 | 5/1960 | Lowey, Jr. | 425/466 |
| 3,096,543 | 7/1963 | Konopacke et al. | 425/466 |
| 3,464,087 | 9/1969 | Koch | 425/133.5 |
| 3,829,274 | 8/1974 | Melead | 425/466 |
| 3,940,221 | 2/1976 | Nissel | 425/141 |
| 4,003,689 | 1/1977 | Harrison et al. | 425/466 |
| 4,201,534 | 5/1980 | Phipps | 425/466 X |
| 4,302,172 | 11/1981 | Hogseth et al. | 425/141 X |
| 4,382,766 | 5/1983 | Feuerherm | 425/466 X |

FOREIGN PATENT DOCUMENTS 3427912  3/1986  Fed. Rep. of Germany .

Primary Examiner—Richard L. Chiesa
Attorney, Agent, or Firm—Watson, Cole, Grindle & Watson

[57] ABSTRACT

An extrusion die having an adjustable lip opening through which thermoplastic material is forced to form a flat sheet. Fine adjustment of the lip is effected thermally and without play by the provision of an element or a heating or cooling block which braces the lip. Coarse adjustment is effected manually, and without play, by operation of a pair of bolts. One bolt axially shifts the block, and the other bolt tightens the block against the die body.

4 Claims, 1 Drawing Sheet

EXTRUSION DIE FOR THE PRODUCTION OF A FLAT SHEET OF THERMOPLASTIC MATERIAL

BACKGROUND OF THE INVENTION

This invention relates to an extrusion die for the production of a flat sheet of thermoplastic material, the die comprising a pair of die bodies having means together forming a slit along the width thereof through which thermoplastic material is forced to form a sheet or a web, one of the die bodies having a lip adjustable relative to the other of the die bodies for varying the size of the slit opening.

Thermoplastic material, for example granulated polyolefins, are melted and extruded at working temperatures of from 200° to 320° C. The material is forced through the slit of the aforedescribed extension die to form the sheet or web. An instrument for measuring temperature is mounted in the direction of feed of the sheets or webs for measuring the predetermined slit width which is controlled via a computer. Such temperature measuring instruments usually operate according to the reflection principal with ultrared light, or according to the transmission principal with radioactive radiation for continuously measuring the thickness transverse to the direction of feed.

U.S. Pat. No. 3,940,221 discloses an extrusion die generally of the type described above. One die body has a rigid lip and the other die body has a flexible lip forming together therewith a slit through which flowable material is extruded to form a sheet. Such other die body has a recess formed by a pair of spaced shoulders for the reception of a heating and cooling block. The block has a continuous bore coaxial with bores extending through the shoulders, the shoulder bore adjacent the flexible lip being smooth, and the other shoulder bore being internally threaded. An elongated metal rod extends through these coaxial bores and bears at its operating end against the flexible lip. The rod is externally threaded at its other end for threaded engagement with the threaded shoulder bore, the shoulder, providing a stop face for the head of the metal rod. The heating and cooling block has a heating cartridge and a cooling channel through which a gaseous medium flows. Once an initial adjustment has been made by a mechanical turning of the head of the rod, the rod is then adapted for precise and automatic continuous thermal adjustment of the flexible lip. When the thickness of the sheet being extruded is excessive, the heating cartridge is energized to emit heat which is conveyed by conduction to the elongated rod, thereby raising its temperature and causing it to expand. Since the upper end of the rod is threaded to the outer shoulder and thus fixed while the lower end is free to move, the lower end of the rod is forceably displaced in an axial direction, pressing upon the flexible lip and bending it slightly for swinging movement about its necked down portion to narrow the slit. However, since the metal rod operates only under pressure against the flexible lip, only a fine adjustment of the size of the slit is made possible since adjustment is restricted by thermal changes in the length of the rod.

Since initial adjustment is made by a mechanical turning of the head of the rod, the entire width of the thickness of the sheet is determined, and such thickness is thereby controlled or regulated. Since the thermal changes in length of the metal rod is a fraction of a millimeter, the sheet thickness can be controlled only to a very slight extent such that it becomes time consuming to make necessary mechanical readjustments of the rod for producing substantially thicker or thiner sheets to be extruded.

German Pat. No. 3,427,912 likewise discloses an extrusion die for the production of a flat sheet of thermoplastic material. One die body has a bore for the reception of a ram which bears against the flexible lip of the one body and which can be actuated by an eccentric adjustable drive for effecting coarse adjustments of the width of the die slit. For making fine adjustments of the die slit, the other die body has a field translator, for example a piezoelectric translator, which bears against the flexible lip of the other die body and effects changes in length as a function of changes in voltage applied to thereby adjust its flexible lip. The initial signals of this instrument for measuring thickness of the extruded sheets serves as a control signal for the voltage supplied to the translator. The result is a complete separation between fine adjustment and coarse adjustment without the need to rely on thread bolts and the like, which do not permit a setting free of tolerances as this patent indicates. Apparently, this setting is the prerequisite for the accurate control of the width of the die slit. If a change in the basic setting is necessary during extrusion of the sheets or webs, considerable experience and tactile sensitivity is required of the operators to make the necessary coarse and fine settings compatable with one another so that thereafter the fine setting overlaps the region of the slit width to be regulated or controlled.

U.S. Pat. No. 2,387,718 discloses an extrusion die in which each die body has a bore for the reception of a differential adjusting screw which at one end bears against a confronting flexible lip. The lips together define an extrusion slit and together the lips are T-shaped in cross-section. Thus, coarse and fine adjustment of the slit width requires experience and tactile sensitivity on the part of the operator. Not only pressure but also tensile strength must be exerted via the differential screws on the associated lips for effecting coarse adjustment of the slit. Coarse adjustment is effected for operation of an outer coarse screw thread in engagement with a sleeve located in the bore and mounted against axial displacement. Fine adjustment is effected by operation of a fine threaded screw extending from each inner end of the coarse screw element. In addition to the aforementioned requisite of experience and tactile sensitivity required by the operator in effecting adjustment with this arrangement, the setting adjustment is not free from play and, therefore, the setting is not precise since the reaction force corresponding to the pull and pressure loading on the lip must be picked up by the screw threads which forceably exhibit a tolerance.

It can be therefore seen that slit width of known extrusion dies can be coarsely adjusted only with considerable effort but not without free play, and that fine adjustment can be carried out only over a very small control region but likewise not without free play.

SUMMARY OF THE INVENTION

It is therefore an objection of the present invention to provide an extrusion die for the production of a flat sheet of thermoplastic material in which coarse and fine adjustments of the width of the slit through which thermoplatic material is extruted, are made easier, more effective and substantially without free play upon both coarse and fine adjustment.

In carrying out this objective, one of the die bodies has a lip adjustable relative to the other die body for varying the size of the slit opening, and a device is mounted on the one body for adjusting the lip. Such device comprises an elongated heating and cooling block bearing at one end against the lip and extending between the lip and a projection on the one die body. The block is shiftable along its longitudinal axis to effect coarse adjustment of the lip, and the block has an elongated metal member having capacity to expand and contract thermally to effect fine adjustment of the lip. A bearing plate is located between the projection and an opposite end of the block, and an extension on the block faces the one die at such opposite end and underlies the bearing plate. A first thread bolt lies along such longitudinal axis and loosely extends through the projection, in threaded engagement with the plate and bears against the opposite end of the block to effect coarse adjustment upon operation of such bolt. A second thread bolt is in engagement with the extension and loosely extends through the projection and the plate for tightening the extension against the plate upon operation of this second bolt during such coarse adjustment to thereby assure a tight bearing engagement between the block and the lip. A push-pull element on the block extends beyond the one end thereof and is in engagement with the lip, such that the heating and cooling block engages free from play with the adjustable lip via the push-pull element, upon fine adjustment.

The extension on the block has a smooth bore through which the second bolt extends, and a thread body is mounted in such bore in threaded engagement with the second bolt to effect the tightening of the extension against the plate.

Other objects, advantages and other features of the invention will become more apparent from the following detailed description of the invention when taken in conjunction with the accompanying drawings.

DETAILED DESCRIPTION OF THE INVENTION

Figure 1:
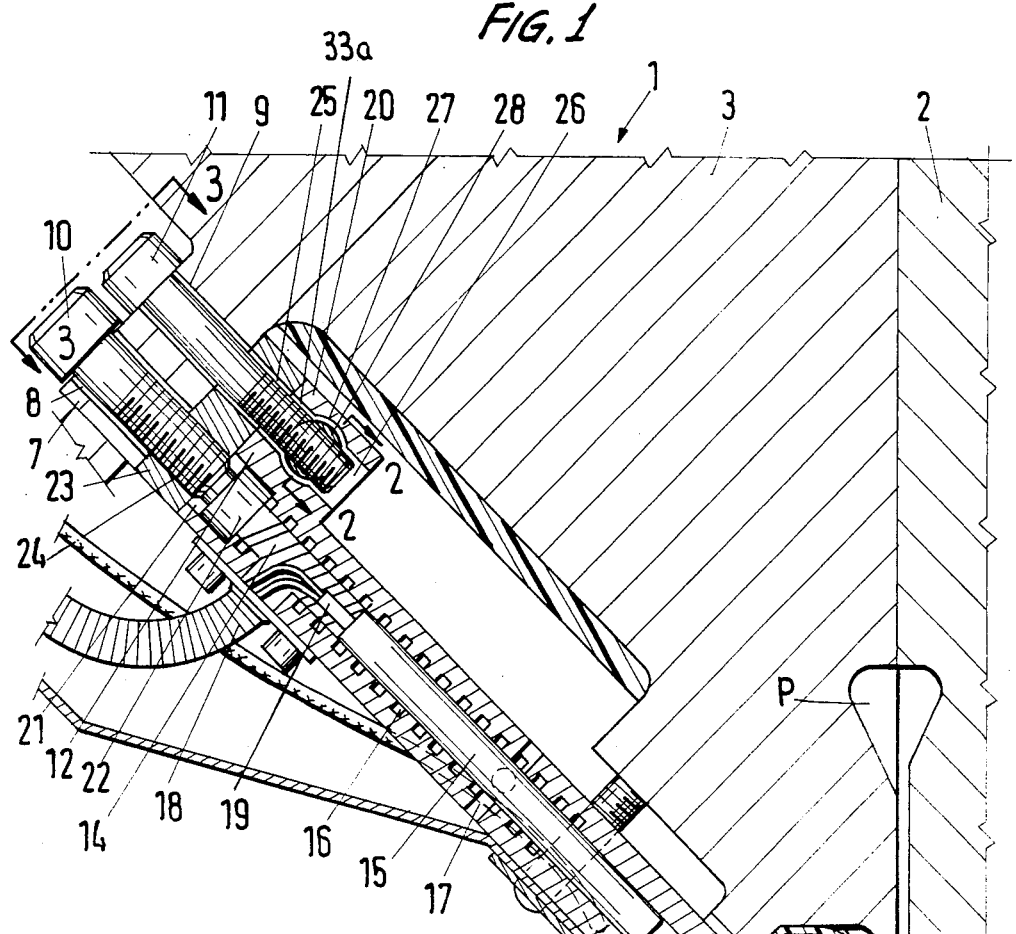
FIG. 1 is a partial, cross-sectional view of an extrusion die for the production of a flat sheet or web of thermoplastic material according to the invention, taken substantially along the line 1—1 of FIG. 3.
Figure 3:
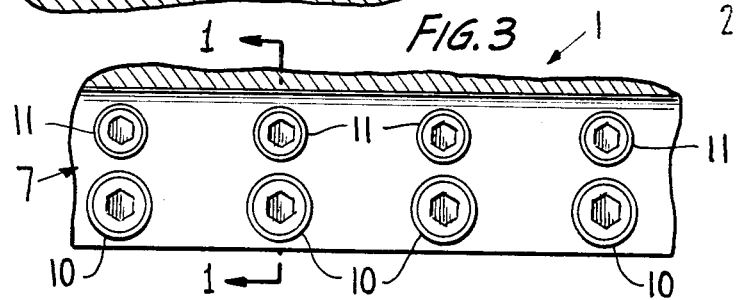
FIG. 3 is a reduced view taken substantially along the line 3—3 of FIG. 1.

Turning now to the drawings wherein like reference characters refer to like and corresponding parts throughout the several views, extrusion die 1 is shown in detail in FIG. 1 as a cross-sectional view of a partial overall view of the die shown in FIG. 3 as having a predetermined width w. The die comprises a pair of cooperating die bodies 2 and 3, die body 2 having a rigid lip 4, and die body 3 having a lip 6 which has a necked down portion defined by recess 5 allowing flexibility of lip 6 for both coarse and fine adjustment. The extrusion die typically has a passageway (not shown) to receive flowable thermoplastic material from a source, such as an extruder outlet (not shown), and has a portion P enabling the flowable material to spread sidewardly (while also moving longitudinally) to assume the width that is required for the desired sheet. A slit S is formed along the entire width W of the die between lips 4 and 6 through which the thermoplastic material exits in the form of a flat sheet or web of predetermined thickness as set by the adjustment of lip 6.

Die body 3 has a recess along its width which defines an extension 7 having pairs of spaced, smooth through bores 8 and 9 through which bolts 10 and 11 extend.

A flat heating and cooling block, generally designated 12, extends along the width of the die, is substantially L-shaped in cross-section and is mounted in the recess of die body 3. Since FIG. 1 is a typical section taken through the extrusion die, the following description of FIG. 1 includes like elements and details at each of the bolt pairs along the width of the die.

Leg 13 of the block extends in the direction of adjustable lip 6, and has a longitudinal bore 14 for the reception of a heating cartridge 15 in the form of an elongated metal rod. The wall of bore 14 has a continuous helical channel 16 through which a gaseous medium is fed as a cooling medium from some suitable source and which exits from the heating and cooling block through a transverse opening 17. The heating cartridge is electrically connected at 19 by an electrical supply line 18 to an energizing source (not shown) for elevating the temperature of cartridge 15 and, by convection, of the entire block 12. One end 33 of the heating and cooling block bears against adjustable lip 6 as shown. In carrying out a fine adjustment of lip 6, supply line 18 is energized for heating cartridge 15 which has capacity to expand and contract thermally. The heat conveyed by conduction to rod 15 raises its temperature and causes it to expand. The entire heating and cooling block is correspondingly caused to expand by radiation, such that end 33 of the block is displaced axially pressing upon the flexible lip and bending it slightly for pivotable movement about the necked down portion formed by recess 5.

Figure 2:
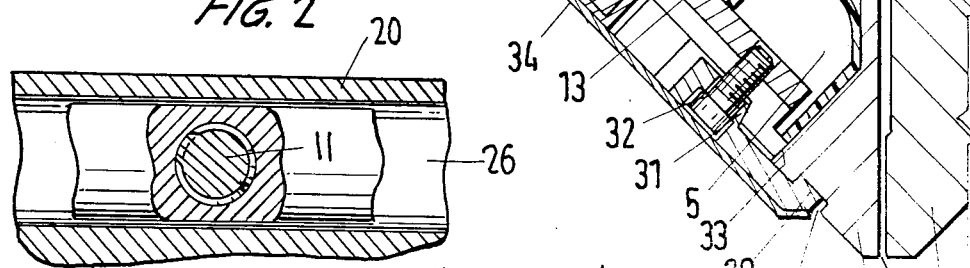
FIG. 2 is a slightly enlarged sectional view taken substantially along the line 2—2 of FIG. 1.

Opposite end 33a of the block has a counterbore 21 of larger diameter than and coaxial with bore 14. A pressure transmitting disc 22 is received in counterbore 21, and the end of bolt 10 abuts against this disc. A bearing plate 23 is located between projection 7 and the opposite end of the block. Plate 23 has an internally threaded opening 24 through which bolt 10 extends in threaded engagement. And, the plate has a smooth bore 25 through which bolt 11 extends. The short leg of the L-shaped block is formed as an extension 20 facing die body 3 and having a smooth through bore 26 coaxial with bores 9 and 25. An opening 27 extends transversely through extension 20 at right angles to the axis of bolt 11, and is of a size greater than that of bore 26. An elongated thread body 28, which may be in the form of a hollow tube shown in FIG. 2, is received within transverse opening 27, and threaded bolt 11 threadedly engages with body 28.

Thus, to effect coarse adjustment of lip 6, bolt 10 is tightened in one direction for axially shifting the heating and cooling block such that end 33 of the block bends or pivots lip 6 about the necked down portion defined by its recess 5. At the same time, bolt 11 is rotated in an opposite direction for tightening extension 20 against projection 7 so as to assure a tight coarse adjustment without play and with sensitivity by rotating the two bolts at the same time. A tight bearing engagement between block 12 and lip 6 is thus assured.

A push-pull element 29, mounted on the block by a threaded fastener 32, has a projection which engages in a groove 30 of flexible lip 6. Element 29 has a wedge surface 31 in engagement with a like surface on the block such that the element is braced without play via the wedge surface with the flexible lip so as to effect a movement-free fine adjustment of the lip by the thermal cartridge. A cover 34 encases the die and also functions as a guide plate for the cooling medium flowing out of the heating and cooling block.

According to the invention, a smooth, manual coarse adjustment of the width of the die slit or gap is assured by actuation of both bolts 10 and 11, and a smooth fine adjustment of the width of the die slit is assured thermally by the heating cartridge. Both coarse and fine adjustment is effected tightly, without play, between the heating and cooling block and die 3.

It should be noted that pairs of bolts 10 and 11 are provided across the entire width W of extrusion die 1, as generally shown in FIG. 3 and as detailed in FIG. 1.

Obviously, many modifications and variations of the present invention are made possible in the light of the above teachings. It is therefore to be understood that within the scope of the appended claims the invention may be practiced otherwise than as specifically described.

What is claimed is:

1. An extrusion die for the production of a flat sheet of thermoplastic material, comprising a pair of die bodies having means together forming a slit along the width thereof through which thermoplastic material is forced to form said sheet, one of said die bodies having a lip adjustable relative to the other of said die bodies for varying the size of the slit opening, a device mounted on said one die body for adjusting said lip, said device comprising an elongated heating and cooling block, bearing at one end against said lip, a projection on said one body, said block extending between said lip and said projection, said block being shiftable along its longitudinal axis to effect coarse adjustment of said lip, and said block having an elongated metal member having capacity to expand and contract thermally to effect fine adjustment of said lip, a bearing plate located between said projection and an opposite end of said block, an extension on said block facing said one die body at said opposite end and underlying said bearing plate, a first thread bolt along said longitudinal axis loosely extending through said projection, in threaded engagement with said plate and bearing against said opposite end to effect said coarse adjustment upon operation of said bolt, a second thread bolt in engagement with said extension and loosely extending through said projection and said plate for tightening said extension against said plate upon operation of said second bolt during said coarse adjustment to thereby assure a tight bearing engagement between said block and said lip.

2. The extrusion die according to claim 1, further comprising a push-pull element on said block extending beyond said one end thereof and in engagement with said lip.

3. The extrusion die according to claim 2, said push-pull element having a wedge surface mating with a corresponding surface provided on said block, and fastening means interengaging said surfaces for bracing push-pull element against said lip.

4. The extrusion die according to claim 1, wherein said extension has a smooth bore through which said second bolt extends, and a thread body mounted in said bore in threaded engagement with said second bolt to effect said tightening of said extension against said plate.

* * * * *

UNITED STATES PATENT AND TRADEMARK OFFICE
CERTIFICATE OF CORRECTION

PATENT NO. : 4,753,587
DATED : Jun. 28, 1988
INVENTOR(S) : Dragan Djordjevic and Uwe Schümichen It is certified that error appears in the above-identified patent and that said Letters Patent is hereby corrected as shown below:

Column 1, line 19, delete "temperature" and insert --thickness--.
Lines 21, 22, delete "temperature" and insert --thickness--.

Column 2, lines 65, 66, delete "thermoplatic" and insert --thermoplastic--.

Signed and Sealed this

Seventh Day of February, 1989

Attest:

DONALD J. QUIGG

Attesting Officer

Commissioner of Patents and Trademarks